(12) United States Patent
McCorkendale et al.

(10) Patent No.: US 7,730,215 B1
(45) Date of Patent: Jun. 1, 2010

(54) DETECTING ENTRY-PORTAL-ONLY NETWORK CONNECTIONS

(75) Inventors: Bruce McCorkendale, Manhattan Beach, CA (US); William E. Sobel, Stevenson Ranch, CA (US)

(73) Assignee: Symantec Corporation, Cupertino, CA (US)

( * ) Notice: Subject to any disclaimer, the term of this patent is extended or adjusted under 35 U.S.C. 154(b) by 1047 days.

(21) Appl. No.: 11/102,517

(22) Filed: Apr. 8, 2005

(51) Int. Cl.
G06F 15/16 (2006.01)

(52) U.S. Cl. .................. 709/250; 709/223; 709/224; 709/225; 717/122; 726/7

(58) Field of Classification Search .............. 709/223, 709/224, 225, 250; 717/122; 726/7
See application file for complete search history.

(56) References Cited

U.S. PATENT DOCUMENTS

| | | | |
|---|---|---|---|
| 5,812,776 A * | 9/1998 | Gifford .................. 709/217 |
| 6,088,803 A | 7/2000 | Tso et al. |
| 6,314,409 B2 | 11/2001 | Schneck |
| 6,460,084 B1 * | 10/2002 | Van Horne et al. ........... 709/227 |
| 6,574,627 B1 * | 6/2003 | Bergadano et al. ............. 707/9 |
| 6,636,894 B1 * | 10/2003 | Short et al. ................ 709/225 |
| 6,718,385 B1 * | 4/2004 | Baker et al. ............... 709/225 |
| 6,842,861 B1 * | 1/2005 | Cox et al. ................. 713/188 |
| 6,928,553 B2 | 8/2005 | Xiong et al. |
| 7,120,664 B2 * | 10/2006 | Sawa et al. ................ 709/203 |
| 7,120,934 B2 * | 10/2006 | Ishikawa ................... 726/23 |
| 7,171,450 B2 * | 1/2007 | Wallace et al. ............. 709/206 |
| 7,249,175 B1 * | 7/2007 | Donaldson ................ 709/225 |
| 7,302,488 B2 * | 11/2007 | Mathew et al. ............. 709/229 |
| 7,406,627 B2 * | 7/2008 | Bailey et al. ................ 714/38 |
| 7,441,041 B2 * | 10/2008 | Williams et al. ........... 709/232 |
| 2002/0083343 A1 | 6/2002 | Crosbie |
| 2002/0087882 A1 | 7/2002 | Schneier et al. |
| 2002/0157020 A1 | 10/2002 | Royer |
| 2003/0003997 A1 * | 1/2003 | Vuong et al. ................ 463/42 |
| 2003/0037251 A1 | 2/2003 | Frieder |
| 2003/0051026 A1 | 3/2003 | Carter |
| 2003/0126133 A1 * | 7/2003 | Dattatri et al. ............... 707/10 |
| 2003/0140155 A1 * | 7/2003 | Harvey et al. .............. 709/230 |
| 2003/0140166 A1 * | 7/2003 | Harvey et al. .............. 709/238 |
| 2003/0233332 A1 * | 12/2003 | Keeler et al. ................ 705/64 |
| 2003/0233580 A1 * | 12/2003 | Keeler et al. ............... 713/201 |
| 2004/0054898 A1 * | 3/2004 | Chao et al. ................. 713/168 |

(Continued)

FOREIGN PATENT DOCUMENTS

WO  WO 0131886 A2 * 5/2001

(Continued)

OTHER PUBLICATIONS

"Application of the Border Gateway Protocol in the Internet", J.Honig, D.Katz, M.Mathis, Y.Rekhter, J.Yu, RFC 1164, Jun. 1990, pp. 17-18.*

(Continued)

*Primary Examiner*—John Follansbee
*Assistant Examiner*—Anthony Mejia
(74) *Attorney, Agent, or Firm*—Fenwick & West LLP

(57) ABSTRACT

A network connection manager detects entry-portal-only network connections. The network connection manager requests content from at least one remote location through a network connection. The network connection manager examines the received content, and determines whether the network connection is an entry-portal-only network connection. In response to detecting an entry-portal-only condition, the network connection manager prompts the user to logon through the entry portal and establish a general purpose network connection.

21 Claims, 4 Drawing Sheets

U.S. PATENT DOCUMENTS

| | | | |
|---|---|---|---|
| 2004/0064740 A1* | 4/2004 | Lin et al. | 713/201 |
| 2004/0185874 A1* | 9/2004 | Kim et al. | 455/456.3 |
| 2005/0021781 A1* | 1/2005 | Sunder et al. | 709/229 |
| 2005/0021818 A1* | 1/2005 | Singhal et al. | 709/232 |
| 2005/0066033 A1* | 3/2005 | Cheston et al. | 709/225 |
| 2005/0114453 A1* | 5/2005 | Hardt | 709/206 |
| 2005/0120242 A1* | 6/2005 | Mayer et al. | 713/201 |
| 2005/0229106 A1* | 10/2005 | Labarge et al. | 715/745 |
| 2005/0229238 A1* | 10/2005 | Ollis et al. | 726/4 |
| 2005/0235044 A1* | 10/2005 | Tazuma | 709/217 |
| 2006/0020924 A1* | 1/2006 | Lo et al. | 717/127 |
| 2006/0031436 A1* | 2/2006 | Sakata et al. | 709/221 |
| 2006/0031575 A1* | 2/2006 | Jayawardena et al. | 709/239 |
| 2006/0090196 A1* | 4/2006 | van Bemmel et al. | 726/4 |
| 2006/0130147 A1* | 6/2006 | Von-Maszewski | 726/25 |
| 2006/0153122 A1* | 7/2006 | Hinman et al. | 370/328 |
| 2006/0230279 A1* | 10/2006 | Morris | 713/182 |
| 2007/0150568 A1* | 6/2007 | Ruiz | 709/223 |
| 2007/0220596 A1* | 9/2007 | Keeler et al. | 726/7 |

FOREIGN PATENT DOCUMENTS

| | | |
|---|---|---|
| WO | WO 01/71499 A1 | 9/2001 |

OTHER PUBLICATIONS

Lee, Sin Yeung; Low, Wai Lup and Wong, Pei Yuen, "Learning Fingerprints for a Database Intrusion Detection System", Computer Security Laboratory, DSO National Labortories, Singapore, ESORICS Nov. 2002, LNCS 2502, pp. 264-279.

Low, Wai Lup, et al., "DIDAFIT: Detecting Intrusions in Databases Through Fingerprinting Transactions," ICEIS 2002, Fourth International Conference On Enterprise Information Systems, vol. 1, Apr. 3-6, 2002, pp. 121-128, Ciudad Real, Spain.

Change log for Analysis Console for Intrusion Detection (Acid), indicating release date of Sep. 8, 2000 [online]. Andrew.cmu.edu [retrieved Apr. 18, 2003]. Retrieved from the Internet: <URL: http://www.andrew.cmu.edu/~rdanyliw/snort/CHANGELOG>, U.S.A.

AirCERT web page, last updated Sep. 18, 2000 [online]. Cert.org [retrieved Apr. 18, 2003]. Retrieved from the Internet: <URL: http://www.cert.org/kb/aircert/>, U.S.A.

Analysis Console For Intrusion Detection (ACID) web page [online]. Andrew.cmu.edu [retrieved Apr. 18, 2003]. Retrieved from the Internet: <URL: http://www.andrew.cmu.edu/~rdanyliw/snort/snortacid.html>, U.S.A.

Schneier, Bruce, Managed Security Monitoring: Network Security for the 21st Century, 2001 [online]. Counterpane.com [retrieved Apr. 18, 2003]. Retrieved from the Internet: <URL: http://www.counterpane.com/msm.pdf>, U.S.A.

Web page, announcing Nov. 11, 2000 release of Dshield [online]. Deja.com [retrieved Apr. 18, 2003]. Retrieved from the Internet: >URL: http://groups.google.com/groups?selm=8vm48v%245pd%241%40nnrp1.deja.com&oe=UTF-8&output=gplain>, U.S.A.

e=Security, Inc., Correlation Technology for Security Event Management, Oct. 7, 2002 [online]. eSecurityins.com [retrieved Apr. 18, 2003]. Retrieved from the Internet: <URL: http://www.esecurityinc.com/downloads/Correlation_WP.pdf>, Vienna, VA.

MyNetWatchman.com web pages indicating Sep. 2000 beta release [online]. MyNetWatchman.com [retrieved Apr. 18, 2003]. Retrieved from the Internet: <URL: http://www.mynetwatchman.com/mynetwatchman/relnotes.htm>, Alpharetta, GA.

2000 Review of eSecurity product on Network Security web page [online]. SCMagazine.com [retrieved Apr. 18, 2003]. Retrieved from the Internet: <URL: http://www.scmagazine.com/scmagazine/2000_12/testc/network.htm#Open>.

"Caltarian Security Technology Platform", Riptech web pages [online]. Symantec.com [retrieved Apr. 18, 2003]. Retrieved from the Internet: <URL: http://enterprisesecurity.symantec.com/Content/displayPDF.cfm?SSSPDFID=35&EID=O>, U.S.A.

Slashdot.org web pages describing Dshield, dated Nov. 27, 2000 [online]. Slashdot.org [retrieved Apr. 18, 2003]. Retrieved from the Internet: <URL: http://slashdot.org/article.pl?sid=00/11/27/1957238&mode=thread>, U.S.A.

Chung, C., Gertz, M., and Levitt, K., "DEMIDS: A Misuse Detection System for Database Systems," Department of Computer Science, University of California at Davis, Oct. 1, 1999, pp. 1-18.

SCIP Product, Microdasys—"The need to control, inspect and manage encrypted webtraffic."[online]. Retrieved on Mar. 18, 2005. Retrieved from the Internet: <URL: http://www.microdasys.com/scipproduct+M54a708de802.html>. Author unknown, 2 pages, Czech Republic.

Microdasys, "S C I P Secured Content Inspection: Protecting the Enterprise from CryptoHacks," 2003 by Microdasys Inc., 2 pages, Czech Republic.

Marketing, "Digital Certificates—Best Practices—A Microdasys Whitepaper," bestpractice.doc, Revision 1.1 (Jul. 31, 2003), 6 pages, Czech Republic.

Network Computing Solutions—"Microdasys SCIP" [online]. Retrieved on Mar. 18, 2005. Retrieved from the Internet: <URL: http://www.ncs/cz/index.php?language=en&menuitem-4&subitem=13>, 2 pages, Czech Republic.

Network Computing Solutions—NSC Homepage—News [online]. Retrieved on Mar. 18, 2005. Retrieved from the Internet: <URL: http://www.nsc.cz/index.php?language=en&menuitem=0&subitem=4&subitem=13>, 3 pages, Czech Republic.

"SSL Stripper Installation Guide," [online]. Retrieved in Mar. 2005 from the Internet: <URL: http://www.sslstripper.com>, 2 pages, U.S.A.

SSL Stripper Home Page, "Security Solutions: SSL Stripper," [online]. Retrieved on Mar. 18, 2005. Retrieved from the Internet: <URL: http://www.vroyer.org/sslstripper/index.html>, 2 pages, Oct. 15, 2004, U.S.A.

SSL Stripper Sample Screenshots, "Security Solutions: Sample Screenshots," [online]. Retrieved on Mar. 18, 2005. Retrieved from the Internet: <URL: http://www.vroyer.org/sslstripper/screenshots.html>, 3 pages, Oct. 15, 2004, U.S.A.

Webwasher AG/Full feature set, "Full feature set," [online]. Retrieved on Mar. 18, 2005. Retrieved from the Internet: <URL: http://www.webwasher.com/enterprise/products/webwasher_products/ssl_scanner/full_feature_set..html?l...>, 2 pages.

Webwasher AG/Webwasher 1000 CSM Appliance; "Webwasher 1000 CSM Appliance," [online]. Retrieved on Mar. 18, 2005. Retrieved from the Internet: <URL: http://www.webwasher.com/enterprise/products/webwasher_products/csm_appliance/index...> 2 pages.

Webwasher AG/Webwasher URL Filter, "Webwasher URL Filter," [online]. Retrieved on Mar. 18, 2005. Retrieved from the Internet: <URL: http://www.webwasher.com/enterprise/products/webwasher_products/webwasher_url_filter..> 1 page.

Webwasher AG/Webwasher Anti Virus, "Webwasher Anti Virus," [online]. Retrieved on Mar. 18, 2005. Retrieved from the Internet: <URL: http://www.webwasher.com/enterprise/products/webwasher_products/anti_virus/index.html...>, 2 pages.

Webwasher AG/Webwasher Anti Spam, "Webwasher Anti Spam," [online]. Retrieved on Mar. 18, 2005. Retrieved from the Internet: <URL: http://www.webwasher.com/enterprise/products/webwasher_products/anti_spam/index.htm...>, 1 page.

Webwasher AG/Webwasher Content Protection, "Webwasher Content Protection," [online]. Retrieved on Mar. 18, 2005. Retrieved from the Internet: <URL: http://www.webwasher.com/enterprise/products/webwasher_products/content_protection/index.html>, 2 pages.

Webwasher AG/Webwasher SSL Scanner, "Webwasher SSL Scanner," [online]. Retrieved on Mar. 18, 2005. Retrieved from the Internet: <URL: http://www.webwasher.com/enterprise/products/webwasher_products/ssl_scanner/index.html>, 2 pages.

CyberGuard Corporation, "CyberGuard and Webwasher: The Value Proposition," A CyberGuard Corporation White Paper, May 2004, 6 pages.

* cited by examiner

DETECTING ENTRY-PORTAL-ONLY NETWORK CONNECTIONS

TECHNICAL FIELD

This invention pertains generally to computer networking, and more specifically to determining whether an established network connection is an entry-portal-only connection.

BACKGROUND

Fee based Internet access provided in hotel rooms and areas with wireless Internet access such as airports and coffee shops requires sign-on and/or payment through a web-based entry portal before allowing general network access. Such environments will not allow access to anything but the entry portal until authorization and/or payment has been established. Requiring users to start with the entry portal is enforced by returning the content of the entry portal regardless of the content being requested by a browser or other application. Authorization for use is usually limited to a period of 24 hours or so; once that period has expired, re-authorization/purchase is required and conditions revert to the state where all network requests, regardless of the requested address, return the content of the entry portal. From the point of view of an operating system (and therefore network aware applications running under the operating system as well), a valid network connection seems to have been established. The operating system and its applications do not have the ability to distinguish between the entry-portal-only network connection and a network connection authorized for general use.

Such conditions can lead to very confusing results for both applications and their users. Under entry-portal-only conditions, not only does it appear to applications that a general purpose network connection is available, but requests for specific content return unexpected content (i.e., the entry portal content) rather than an error. For example, imagine a process that automatically updates files used by a software program by copying the latest version of the files from a location on the Internet. When such a process attempts to retrieve a file through an entry-portal-only network connection, content is returned (the entry portal content) that causes the update program to "believe" that it has retrieved the requested file. When the process then tries to validate the retrieved content (e.g., by checking for an identifying signature or the like), the process finds the content to be invalid and displays an error message so indicating to the user. This can easily lead the user to believe that the content has been compromised and, at the very least, lead to a support call to the application vendor.

What is needed are computer implemented methods, computer readable media and computer systems for detecting when a network connection is an entry-portal-only connection, and for directing the user to the appropriate solution (i.e., proceeding through the entry portal and establishing a general network connection).

DISCLOSURE OF INVENTION

Computer-implemented methods, computer systems and non-transitory computer-readable media detect an entry-portal-only network connection. A network connection manager requests content from at least one remote location through a network connection. The network connection manager examines the received content, and determines whether the network connection is an entry-portal-only network connection.

In some embodiments, the network connection manager requests content from at least one remote location at which content is known not to be present. Responsive to receiving content in response to a request to a location at which content is known not to be present, the network connection manager determines that the received content is entry portal content, and that the network connection is an entry-portal-only network connection. In response to detecting an entry-portal-only condition, the network connection manager can prompt the user to logon through the entry portal, and establish a general purpose network connection.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
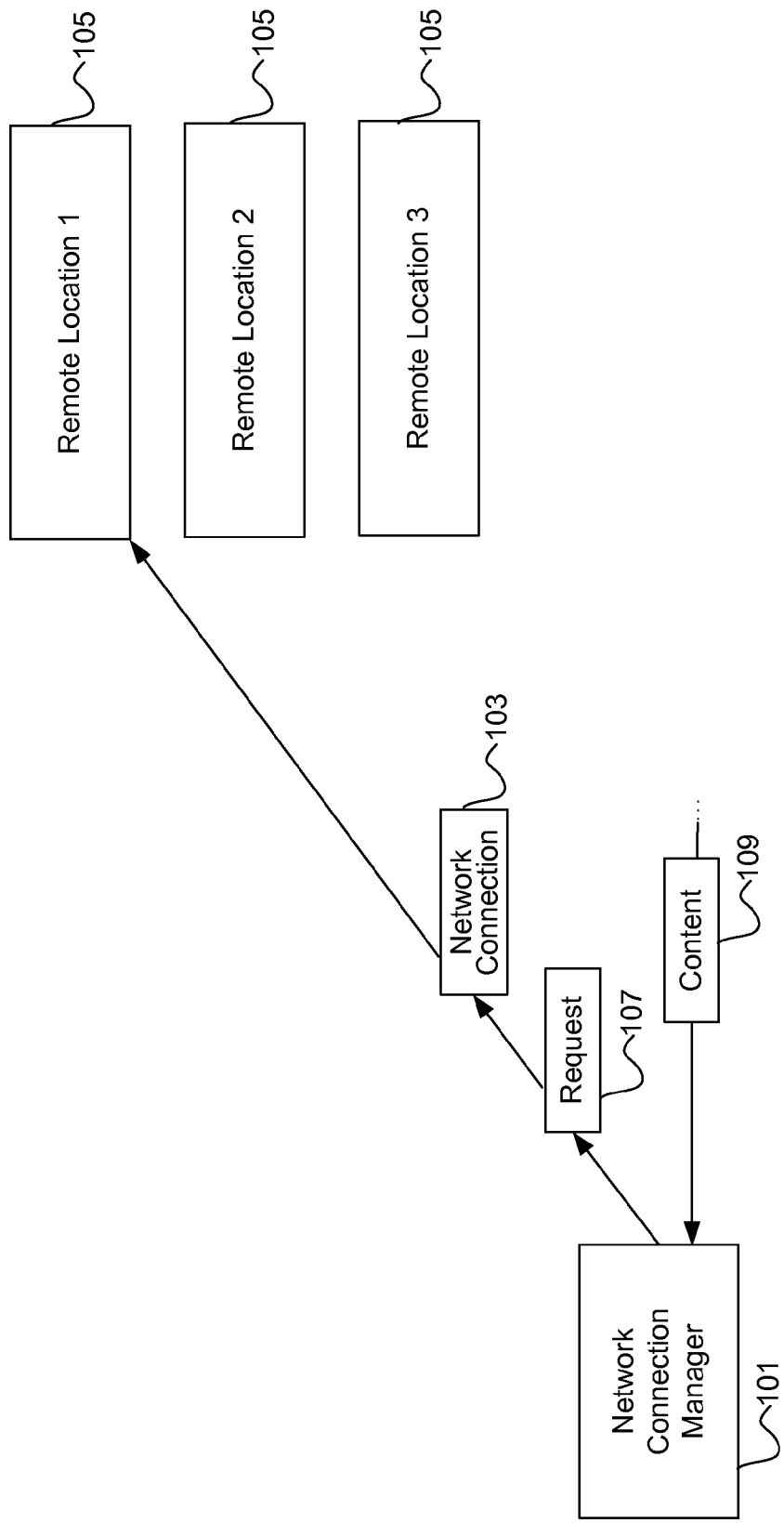
FIG. 1 is a block diagram, illustrating a high level overview of a system for detecting an entry-portal-only network connection, according to some embodiments of the present invention.

FIG. 1 illustrates a high level overview of a system 100 for practicing some embodiments of the present invention. A network connection manager 101 detects an entry-portal-only network connection 103A. The network connection manager 101 requests content 109 from at least one remote location 105 through a network connection 103, examines the received content 109, and determines whether the network connection 103 is an entry-portal-only network connection 103A or a general purpose connection 103B.

It is to be understood that although the network connection manager 101 is illustrated as a single entity, as the term is used herein a network connection manager 101 refers to a collection of functionalities which can be implemented as software, hardware, firmware or any combination of these. Where a network connection manager 101 is implemented as software, it can be implemented as a standalone program, but can also be implemented in other ways, for example as part of a larger program, as a plurality of separate programs, as one or more device drivers or as one or more statically or dynamically linked libraries.

It is to be further understood that a network connection manager 101 can be instantiated on and/or as part of a server, client, firewall, intrusion detection system, proxy, gateway, switch and/or any combination of these and/or other computing devices and/or platforms.

As illustrated in FIG. 1, in some embodiments of the present invention, so called "black hole" remote locations 105 are used by the network connection manager 101 to detect an entry-portal-only network connection 103. More specifically, the network connection manager 101 makes one or more requests 107 for content 109 through the network connection 103 to one or more remote locations 105 at which it is known that no content 109 is present (e.g., reserved sites under the control of the system 100 which are never populated with content 109—the proverbial black hole). If content 109 is returned responsive to a request 107 made to such a "black hole" location 105, there is strong evidence that the open network connection 103 is an entry-portal-only connection 103A, and that the content 109 being returned is the entry portal content 109.

In one embodiment, the network connection manager 101 determines that the network connection 103 is an entry-portal-only network connection 103A responsive to receiving content 109 in response to a single request 107 made to a single black hole location 105. In other embodiments, the network connection manager 101 only makes such a determination after receiving content 109 in response to multiple requests 107 made to one or multiple black hole location(s) 105. The number of requests 107 and locations 105 utilized to make such a determination is, of course, a variable design parameter which can be adjusted up and down as desired, based upon the level of certainty desired.

In one embodiment, the content 109 returned in response to separate requests made to two (or more) distinct black-hole locations 105 is compared. If the content 109 returned in response to the requests 107 from the separate locations 105 is identical (or substantially similar), the network connection manager 101 determines that each request 107 is returning the entry-portal content 109, and thus that the network connection 103 is an entry-portal-only connection 103A. How similar the content must be in order to be considered "substantially similar" is a variable design parameter.

In another embodiment, the network connection manager 101 periodically requests 107 content 109 from at least one location 105 at which content 109 is known not to be present. In that embodiment, the network connection manager 101 determines that the network connection 103 is an entry-portal-only connection 103A responsive to receiving content 109 in response to at least one such periodic request 107. How often to issue the periodic requests 107, how many locations 105 to issue the requests 107 to, and how many requests 107 must result in the receipt of content 109 in order to detect an entry portal condition are all variable design choices.

In some embodiments, the network connection manager 101 can hook and monitor requests 107 made by other processes for network connection 103 activity (e.g., requests 107 to open a network connection 103, requests to move data 109 across the network connection 103, etc.). In one such embodiment, when the network connection manager 101 detects that a process has successfully established a network connection 101, the network connection manager 101 makes a request 107 for content 109 from at least one remote location 105 at which content 109 is known not to be present. Responsive to receiving content 109 in response to at least one such request 107, the network connection manager 101 determines that the established network connection 103 is an entry-portal-only network connection 103A. The implementation mechanics of hooking and monitoring requests 107 for network connection 103 activity are known to those of ordinary skill in the relevant art, and the use thereof in the context of the present invention will be readily apparent to those of such skill in light of the this specification.

In another embodiment, to obtain a higher level of certainty, after receiving content 109 in response to at least one request 107 for content 109 from at least one remote location 105 at which content 109 is known not to be present, the network connection manager 101 continues to monitor requests 107 for content 109 made by other processes to other locations 105, and compares content 109 returned therefrom to the content 109 returned in response to its request 107 to the black hole location 105. If content 109 returned in response to another process's request 107 is identical or substantially similar to that retrieved in response to the request 107 to the black hole location 105 made when the network connection 103 was established, then the network connection manager 101 concludes that it is operating under entry-portal-only conditions.

Figure 2:
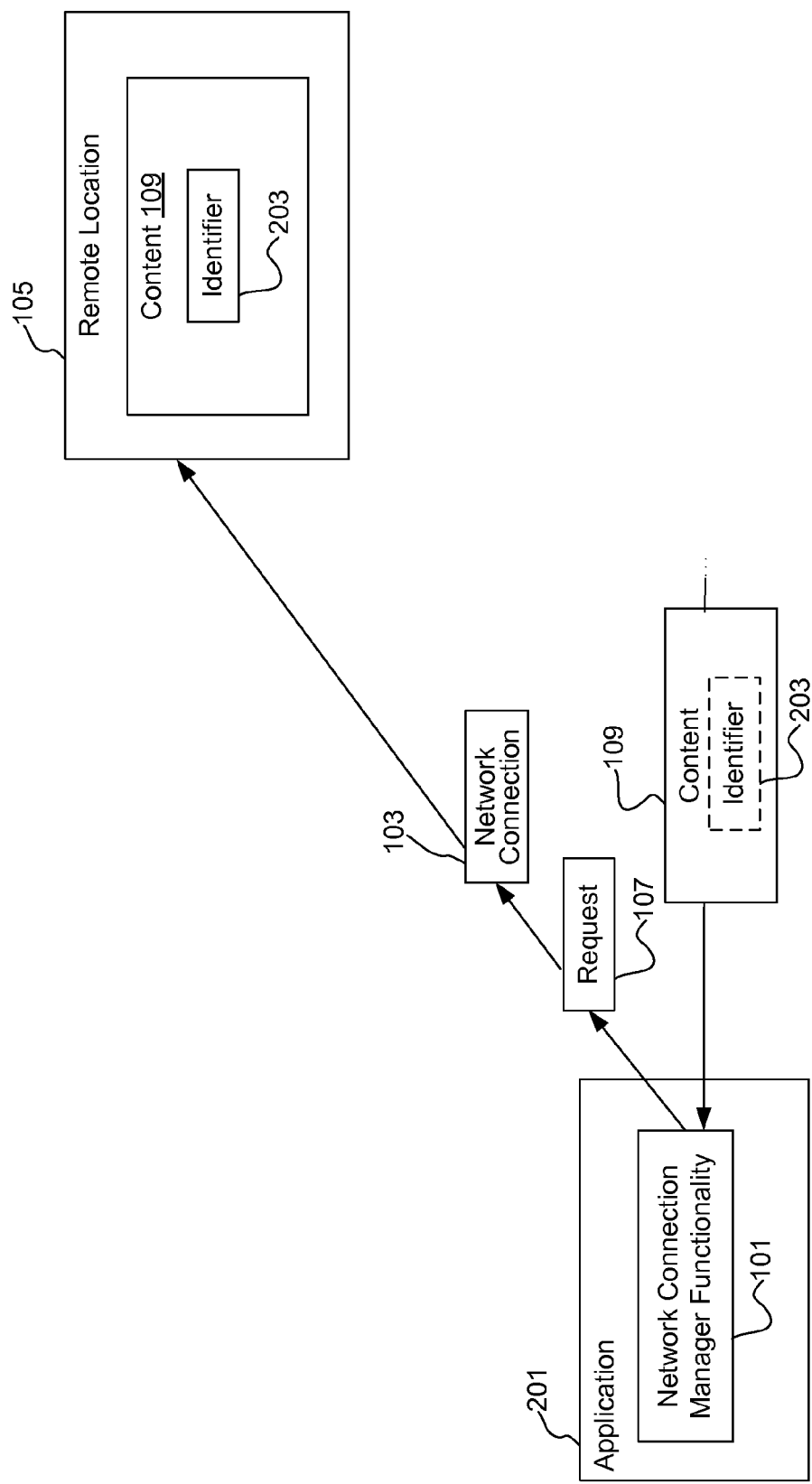
FIG. 2 is a block diagram, illustrating a high level overview of an application specific embodiment of the present invention.

Turning now to FIG. 2, other embodiments of the present invention are application 201 specific. Distinguishable identifying information 203 can be placed into legitimate content 109 which a specific application 201 is to request 107 from a specific remote location 105. Network connection manager 101 functionality within the particular application 201 can detect an entry-portal-only condition by examining the response it receives when requesting the particular piece of content 109. Upon receiving content 109, the application 201 can check for the identifying information 203. If the identifying information 203 is not present in the received content 109, the application 201 can determine that the network connection 103 is an entry-portal-only network connection 103A. As will be readily apparent to those of ordinary skill in the relevant art in light of this specification, a wide variety of formats are possible for the identifying information 203, all of which are within the scope of the present invention. In some embodiments in which a higher level of certainty is desired, the application 201 can make multiple requests 107, compare content 109 received from multiple locations 105, etc., before concluding that the network connection 103 is an entry-portal-only network connection 103A.

Figure 3:
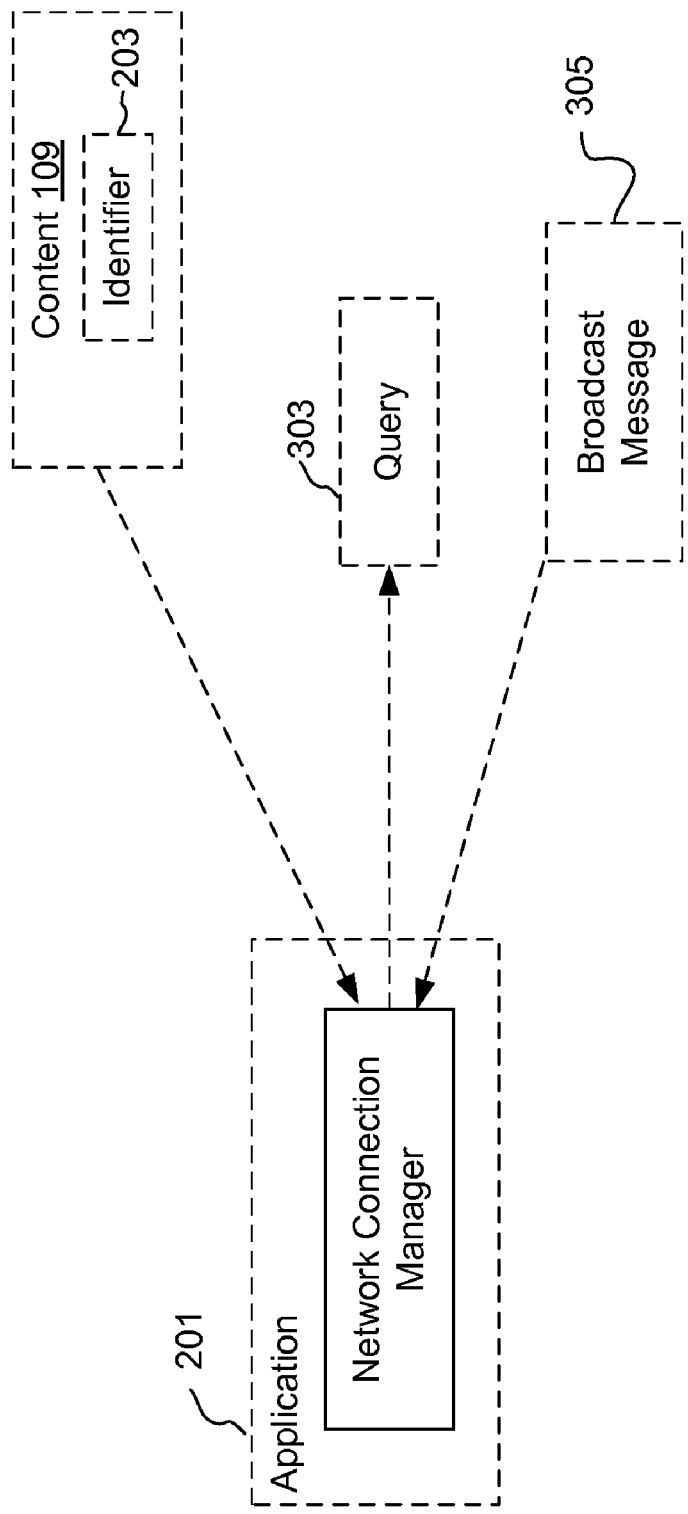
FIG. 3 is a block diagram, illustrating a high level overview of a standards based embodiment of the present invention.

As illustrated in FIG. 3, other embodiments of the present invention take a standards based approach, in which third party cooperation and implementation is utilized. Portal vendors could, by convention or standard, include an identifier 203 in all responses that indicates the entry-portal-only environment. Such an identifier 203 could be included in the header (or body) of the returned content 109. In another embodiment, a protocol is supported that allows any application 201 (or operating system) to submit a query 303 for the presence of an entry-portal-only network connection 103A. In yet another embodiment, the portal vendor transmits broadcast messages 305 indicating an entry portal state. Other embodiment variations for advertising an entry-portal-only condition, or supplying such information responsive to a query 303, will be apparent to those of ordinary skill in the relevant art in light of this specification, and are within the scope of the present invention.

Figure 4:
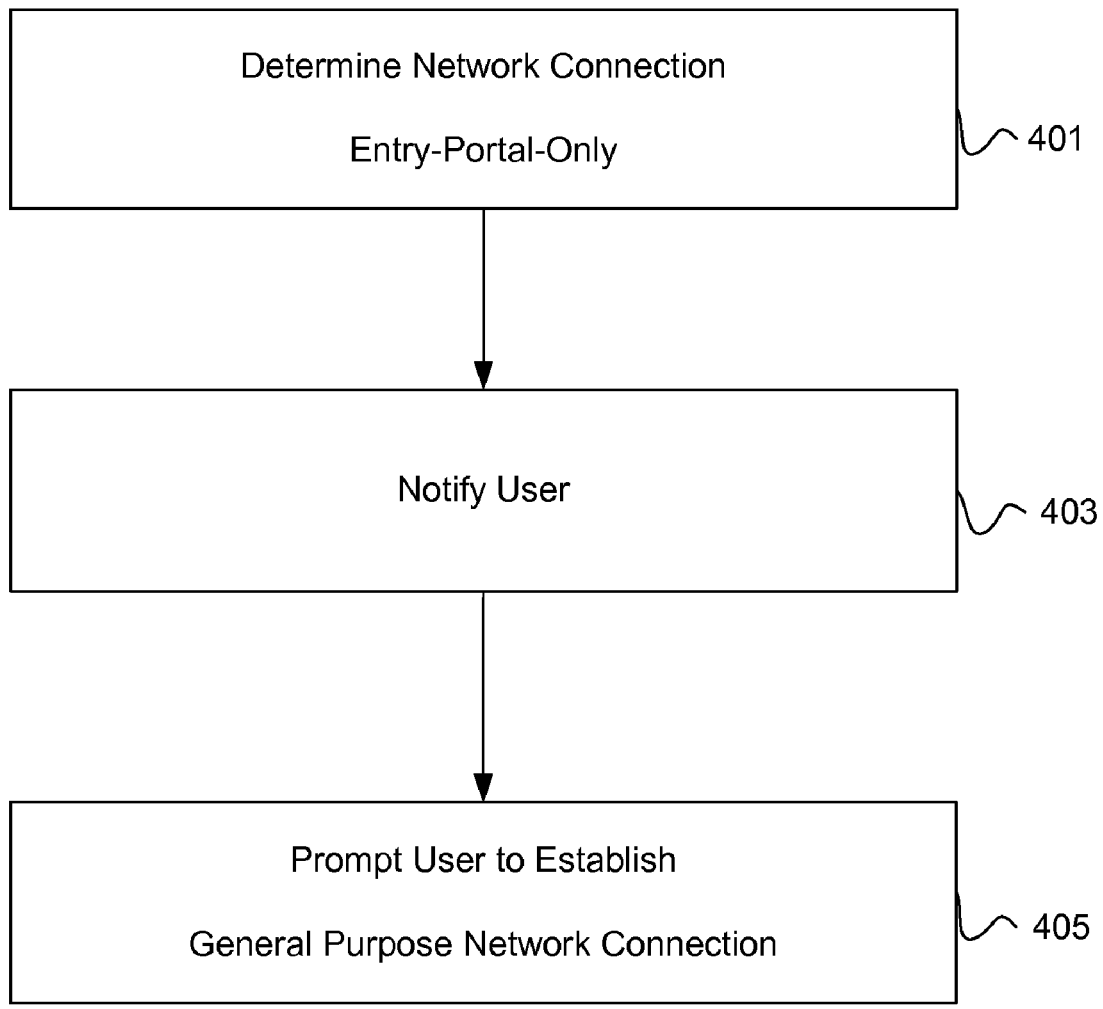
FIG. 4 is a flowchart, illustrating steps for prompting a user to logon through the entry portal, and establish a general purpose network connection, according to some embodiments of the present invention.

As illustrated in FIG. 4, in any of the above described embodiments, once it is determined 401 that the network connection 103 is an entry-portal-only network connection 103A, the network connection manager 101 (or application 201) can notify 403 the user of this condition. Typically, the network connection manager 101 prompts 405 the user to establish a general network connection 103B, for example by offering to (or automatically) bringing up the browser, thereby directing the user down the path towards establishing a general network connection 103B.

As will be understood by those familiar with the art, the invention may be embodied in other specific forms without departing from the spirit or essential characteristics thereof. Likewise, the particular naming and division of the modules, managers, functions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for detecting an entry-portal-only network connection, the method comprising the steps of:
   using a computer configured to execute method steps, the steps comprising:
   requesting, through a network connection, content from at least one remote location at which content is known not to be present;
   receiving unexpected content from the at least one remote location at which content is known not to be present;
   responsive to receiving two or more pieces of unexpected content from the at least one remote location at which content is known not to be present,
   determining that the network connection is an entry-portal-only network connection based on a comparison of the unexpected contents, wherein an entry-portal-only network connection is a network connection that, in response to any request for content, returns content of the entry portal regardless of the content being requested until authorization or payment occurs; and
   responsive to determining that the network connection is an entry-portal-only network connection, notifying a user of the determination.

2. The method of claim 1 further comprising:
   requesting content from at least two remote locations at which content is known not to be present; and
   responsive to receiving unexpected contents content in response to at least two requests to at least two remote locations at which content is known not to be present,
   comparing the unexpected contents content received in response to the at least two requests; and
   responsive to the unexpected contents content received in response to the at least two requests being at least substantially similar, determining that the network connection is an entry-portal-only network connection.

3. The method of claim 1 further comprising:
   periodically requesting content from at least one location at which content is known not to be present; and
   responsive to receiving unexpected content in response to at least one request to at least one remote location at which content is known not to be present, determining that the network connection is an entry-portal-only network connection.

4. The method of claim 1 further comprising:
   monitoring requests made for network connection activity;
   responsive to a successful request to establish a network connection, requesting content from at least one remote location at which content is known not to be present; and
   responsive to receiving unexpected content in response to at least one request to at least one remote location at which content is known not to be present, determining that the network connection is an entry-portal-only network connection.

5. The method of claim 1 further comprising:
   monitoring requests made for network connection activity;
   responsive to a successful request to establish a network connection, requesting content from at least one remote location at which content is known not to be present;
   responsive to receiving unexpected content in response to at least one request to at least one remote location at which content is known not to be present, monitoring subsequent requests for content from remote locations;
   comparing the unexpected content received in response to at least one request to at least one remote location at which content is known not to be present and unexpected content received responsive to a subsequent monitored request for content from a remote location; and
   responsive to the unexpected content received in response to the at least one request to the at least one remote location at which content is known not to be present and the unexpected content received responsive to a subsequent monitored request for content from a remote location being at least substantially similar,
   determining that the network connection is an entry-portal-only network connection.

6. The method of claim 1 further comprising:
   including an identifier in specific content on at least one remote location;
   requesting specific content from at least one remote location on which specific content is known to be present;
   examining content received in response to at least one request to at least one remote location on which specific content is known to be present for the identifier; and
   responsive to the identifier not being present in the received content, determining that the network connection is an entry-portal-only network connection.

7. The method of claim 1 further comprising:
   responsive to determining that the network connection is an entry-portal-only network connection, prompting a user to establish a general network connection.

8. A non-transitory computer readable storage medium encoded with a computer program product for detecting an entry-portal-only network connection, the computer program product comprising program code executable on a computer system comprising:
   program code for requesting, through a network connection, content from at least one remote location at which content is known not to be present;
   program code for receiving unexpected content from the at least one remote location at which content is known not to be present;

program code for, responsive to receiving two or more pieces of unexpected content from the at least one remote location at which content is known not to be present,
determining that the network connection is an entry-portal-only network connection based on the unexpected contents, wherein an entry-portal-only network connection is a network connection that, in response to any request for content, returns content of the entry portal regardless of the content being requested until authorization or payment occurs; and
program code for notifying a user of the determination responsive to determining that the network connection is an entry-portal-only network connection.

9. The computer program product of claim 8 further comprising:
program code for requesting content from at least two remote locations at which content is known not to be present; and
program code for, responsive to receiving unexpected contents content in response to at least two requests to at least two remote locations at which content is known not to be present, comparing the unexpected contents content received in response to the at least two requests; and
program code for, responsive to the unexpected contents content received in response to the at least two requests being at least substantially similar, determining that the network connection is an entry-portal-only network connection.

10. The computer program product of claim 8 further comprising:
program code for monitoring requests made for network connection activity;
program code for, responsive to a successful request to establish a network connection,
requesting content from at least one remote location at which content is known not to be present; and
program code for, responsive to receiving unexpected content in response to at least one request to at least one remote location at which content is known not to be present, determining that the network connection is an entry-portal-only network connection.

11. The computer program product of claim 8 further comprising:
program code for monitoring requests made for network connection activity; program code for, responsive to a successful request to establish a network connection,
requesting content from at least one remote location at which content is known not to be present;
program code for, responsive to receiving unexpected content in response to at least one request to at least one remote location at which content is known not to be present, monitoring subsequent requests for content from remote locations;
program code for comparing the unexpected content received in response to at least one request to at least one remote location at which content is known not to be present and unexpected content received responsive to a subsequent monitored request for content from a remote location; and
program code for, responsive to the unexpected content received in response to the at least one request to the at least one remote location at which content is known not to be present and the unexpected content received responsive to a subsequent monitored request for content from a remote location being at least substantially similar, determining that the network connection is an entry-portal-only network connection.

12. The computer program product of claim 8 further comprising:
program code for including an identifier in specific content on at least one remote location;
program code for requesting specific content from at least one remote location on which specific content is known to be present;
program code for examining content received in response to at least one request to at least one remote location on which specific content is known to be present for the identifier; and
program code for, responsive to the identifier not being present in the received content, determining that the network connection is an entry-portal-only network connection.

13. A computer system for detecting an entry-portal-only network connection, the computer system comprising:
a non-transitory computer-readable storage medium storing executable software portions, comprising:
a software portion configured to request, through a network connection, content from at least one remote location at which content is known not to be present;
a software portion configured to receive unexpected content from the at least one remote location at which content is known not to be present;
a software portion configured to, responsive to receiving two or more pieces of unexpected content from the at least one remote location at which content is known not be present,
determine that the network connection is an entry-portal-only network connection based on the unexpected contents, wherein an entry-portal-only network connection is a network connection that, in response to any request for content, returns content of the entry portal regardless of the content being requested until authorization or payment occurs;
a software portion configured to notify a user of the determination responsive to determining that the network connection is an entry-portal-only network connection; and
the computer system configured to execute the software portions stored by the non-transitory computer readable storage medium.

14. The computer system of claim 13 further comprising:
a software portion configured to request content from at least two remote locations at which content is known not to be present; and
a software portion configured to compare unexpected contents content received in
response to the at least two requests, responsive to receiving content in response
to at least two requests to at least two remote locations at which content is known not to be present; and
a software portion configured to determine that the network connection is an entry-portal-only network connection, responsive to the unexpected contents content received in response to the at least two requests being at least substantially similar.

15. The computer system of claim 13 further comprising:
a software portion configured to monitor requests made for network connection activity;
a software portion configured to request content from at least one remote location at which content is known not to be present, responsive to a successful request to establish a network connection; and a software portion configured to determine that the network connection is an entry-portal-only network connection, responsive to receiving unexpected content in response to at least one request to at least one remote location at which content is known not to be present.

16. The computer system of claim 13 further comprising:
a software portion configured to monitor requests made for network connection activity; a software portion configured to request content from at least one remote location at which content is known not to be present, responsive to a successful request to establish a network connection;
a software portion configured to monitor subsequent requests for content from remote locations, responsive to receiving unexpected content in response to at least one request to at least one remote location at which content is known not to be present; a software portion configured to compare the unexpected content received in response to at least one request to at least one remote location at which content is known not to be present and unexpected content received responsive to a subsequent monitored request for content from a remote location; and
a software portion configured to determine that the network connection is an entry-portal-only network connection, responsive to the unexpected content received in response to the at least one request to the at least one remote location at which content is known not to be present and the unexpected content received responsive to a subsequent monitored request for content from a remote location being at least substantially similar.

17. The computer system of claim 13 further comprising:
a software portion configured to include an identifier in specific content on at least one remote location;
a software portion configured to request specific content from at least one remote location on which specific content is known to be present;
a software portion configured to examine content received in response to at least one request to at least one remote location on which specific content is known to be present for the identifier; and
software portion configured to determine that the network connection is an entry-portal-only network connection, responsive to the identifier not being present in the received content.

18. A computer implemented method for determining that a network connection is an entry-portal-only network connection with a pre-determined level of certainty, the method comprising the steps of:
using a computer configured to execute method steps, the steps comprising:
requesting, through a network connection, content from a first remote location at which content is known not to be present;
receiving a first unexpected content from the first remote location at which content is known not to be present;
requesting, through the network connection, content from a second remote location at which content is known not to be present;
receiving a second unexpected content from the second remote location at which content is known not to be present;
comparing the first unexpected content returned from the first remote location and the second unexpected content returned from the second remote location;
responsive to the first unexpected content and the second unexpected content being identical or substantially similar:
increasing a level of certainty that the network connection is an entry-portal-only network connection;
in response to the level of certainty reaching a predetermined level determining that the network connection is an entry-portal-only network connection, wherein an entry-portal-only network connection is a network connection that, in response to any request for content, returns content of the entry portal regardless of the content being requested until authorization or payment occurs; and
in response to determining that the network connection is an entry-portal-only network connection, notifying a user of the determination.

19. The method of claim 18, further comprising sending broadcast messages indicating the entry-portal-only status of the network connection to a plurality of network applications.

20. The method of claim 1, wherein determining that the network, connection is an entry-portal-only network connection based on a comparison of the unexpected contents further comprises, responsive to the comparison of the two or more pieces of unexpected content indicating that the two or more pieces of unexpected content received are identical or substantially similar, determining that requests for content through the network connection are returning only entry-portal content, and thus the network connection is an entry-portal-only network connection.

21. The method of claim 1, further comprising:
requesting, through the network connection, content from a second remote location at which content is known not to be present;
receiving unexpected content from the second remote location at which content is known not to be present;
comparing the unexpected content received from the at least one remote location with the unexpected content received from the second remote location; and
responsive to the comparison indicating that the unexpected contents received are identical or substantially similar, determining that requests for content through the network connection are returning only entry-portal content, and thus the network connection is an entry-portal-only network connection.

* * * * *